(12) United States Patent
Iida et al.

(10) Patent No.: US 12,055,213 B2
(45) Date of Patent: Aug. 6, 2024

(54) TRANSFER SYSTEM OF WORK MACHINE, WORK MACHINE, AND METHOD OF PREDICTING LIFETIME OF TRANSFER SYSTEM IN WORK MACHINE

(71) Applicant: KOMATSU LTD., Tokyo (JP)

(72) Inventors: Hiroki Iida, Tokyo (JP); Takatoshi Sasaki, Tokyo (JP); Masaya Katou, Tokyo (JP)

(73) Assignee: KOMATSU LTD., Tokyo (JP)

(*) Notice: Subject to any disclaimer, the term of this patent is extended or adjusted under 35 U.S.C. 154(b) by 366 days.

(21) Appl. No.: 17/633,673

(22) PCT Filed: Jun. 15, 2020

(86) PCT No.: PCT/JP2020/023326
§ 371 (c)(1),
(2) Date: Feb. 8, 2022

(87) PCT Pub. No.: WO2021/053903
PCT Pub. Date: Mar. 25, 2021

(65) Prior Publication Data
US 2022/0316588 A1 Oct. 6, 2022

(30) Foreign Application Priority Data

Sep. 20, 2019 (JP) ................. 2019-172030

(51) Int. Cl.
*F16H 61/12* (2010.01)
*F16D 48/06* (2006.01)
(Continued)

(52) U.S. Cl.
CPC ............ *F16H 61/12* (2013.01); *F16D 48/06* (2013.01); *F16H 57/01* (2013.01); *F16H 59/74* (2013.01);
(Continued)

(58) Field of Classification Search
CPC ..... F16D 2500/3166; F16D 2500/5023; F16D 2300/10; F16H 2057/014; F16H 2061/1276
See application file for complete search history.

(56) References Cited

U.S. PATENT DOCUMENTS

| 5,505,675 A | 4/1996 | Kuriyama et al. |
| 5,888,171 A | 3/1999 | Sasaki et al. |

(Continued)

FOREIGN PATENT DOCUMENTS

| CN | 102422043 A | 4/2012 |
| CN | 103486241 A | 1/2014 |

(Continued)

*Primary Examiner* — Huan Le
*Assistant Examiner* — Aimee Tran Nguyen
(74) *Attorney, Agent, or Firm* — Faegre Drinker Biddle & Reath LLP

(57) ABSTRACT

A clutch includes a clutch disk that rotates by receiving motive power from an engine and a clutch plate switched between an engaged state in which it is engaged with the clutch disk and a disengaged state in which it is not engaged with the clutch disk. A controller calculates a coefficient of friction μ between the clutch disk and the clutch plate based on a time period Δt elapsed from a first time point when the number of relative rotations of the clutch disk and the clutch plate attains to a first number of rotations to a second time point when a second number of rotations smaller than the first number of rotations is attained, in a state in which the clutch disk rotates while transfer of motive power from the engine to the clutch disk is cut off and in the engaged state.

8 Claims, 5 Drawing Sheets

(51) Int. Cl.
   *F16H 57/01* (2012.01)
   *F16H 59/74* (2006.01)
(52) U.S. Cl.
   CPC ............... *F16D 2500/3166* (2013.01); *F16D 2500/5023* (2013.01); *F16H 2057/014* (2013.01); *F16H 2059/746* (2013.01); *F16H 2061/1276* (2013.01)

(56) References Cited

U.S. PATENT DOCUMENTS

| | | | |
|---|---|---|---|
| 6,117,048 A | 9/2000 | Toyama | |
| 6,334,833 B1 | 1/2002 | Ochi et al. | |
| 8,651,256 B2 * | 2/2014 | Bitzer | F16D 66/026 192/30 W |
| 2010/0108420 A1 | 5/2010 | Keiji | |
| 2012/0053801 A1 | 3/2012 | Hangen | |
| 2013/0179030 A1 * | 7/2013 | Kneissler | F16D 48/06 701/33.7 |
| 2013/0332038 A1 | 12/2013 | Williams | |
| 2015/0088388 A1 | 3/2015 | Kanehara et al. | |
| 2016/0258498 A1 * | 9/2016 | Versteyhe | F16D 48/062 |

FOREIGN PATENT DOCUMENTS

| | | |
|---|---|---|
| CN | 104220789 A | 12/2014 |
| CN | 105822761 A | 8/2016 |
| CN | 105980727 A | 9/2016 |
| CN | 106763285 A | 5/2017 |
| CN | 107429762 A | 12/2017 |
| JP | H08-42676 A | 2/1996 |
| JP | H09-280348 A | 10/1997 |
| JP | H11-344106 A | 12/1999 |
| JP | 2003-202074 A | 7/2003 |

\* cited by examiner (A)

(B)

TRANSFER SYSTEM OF WORK MACHINE, WORK MACHINE, AND METHOD OF PREDICTING LIFETIME OF TRANSFER SYSTEM IN WORK MACHINE

TECHNICAL FIELD

The present disclosure relates to a transfer system of a work machine, a work machine, and a method of predicting lifetime of a transfer system in a work machine.

BACKGROUND ART

Some work machines such as a truck and a crawler dozer are provided with a clutch between a drive source (an engine or a motor) and a drive system. The clutch serves to switch between transfer and cut-off of motive power. Examples of deterioration of the clutch include wear of a clutch disk and a clutch plate.

For example, Japanese Patent Laying-Open No. 9-280348 (see PTL 1) discloses a technique to detect an amount of wear of a clutch disk. In PTL 1, a pressure in a clutch piston chamber is measured and an amount of wear of the clutch is detected based on the pressure.

CITATION LIST

Patent Literature

PTL 1: Japanese Patent Laying-Open No. 9-280348

SUMMARY OF INVENTION

Technical Problem

In PTL 1, however, the amount of friction of the clutch is detected based on the pressure in the clutch piston chamber and hence deterioration of friction performance of a clutch friction plate cannot quantitatively be detected. Even though the clutch friction plate alone can be taken out of a work machine, only a dedicated measurement instrument is able to detect deterioration of friction performance of the clutch friction plate. Therefore, more accurate measurement of deterioration due to friction of the clutch has been desired.

An object of the present disclosure is to provide a transfer system of a work machine capable of more accurate detection of deterioration due to friction of a clutch, a work machine, and a method of predicting lifetime of a transfer system in a work machine.

Solution to Problem

A transfer system of a work machine in the present disclosure includes a drive source, a first clutch, and a controller. The first clutch includes a first member that rotates by receiving motive power from the drive source and a second member switched between an engaged state in which the second member is engaged with the first member and a disengaged state in which the second member is not engaged with the first member. The controller calculates a coefficient of friction between the first member and the second member based on a time period elapsed from a first time point when the number of relative rotations of the first member and the second member attains to a first number of rotations to a second time point when a second number of rotations smaller than the first number of rotations is attained, in a state in which transfer of motive power from the drive source to the first member that is rotating is cut off and in the engaged state.

A work machine in the present disclosure includes the transfer system above.

A method of predicting lifetime of a transfer system in a work machine in the present disclosure includes steps below. Cut-off of transfer of motive power from a drive source to a first member of a first clutch is indicated while the first member is rotating. Engagement of a second member of the first clutch with the first member that is rotating is indicated while transfer of motive power from the drive source to the first member is cut off. A coefficient of friction between the first member and the second member is calculated based on a time period elapsed from a first time point when the number of relative rotations of the first member and the second member attains to a first number of rotations to a second time point when a second number of rotations smaller than the first number of rotations is attained.

Advantageous Effects of Invention

According to the present disclosure, a transfer system of a work machine capable of more accurate detection of deterioration due to friction of a clutch, a work machine, and a method of predicting lifetime of a transfer system in a work machine are provided.

DESCRIPTION OF EMBODIMENTS

Figure 1:
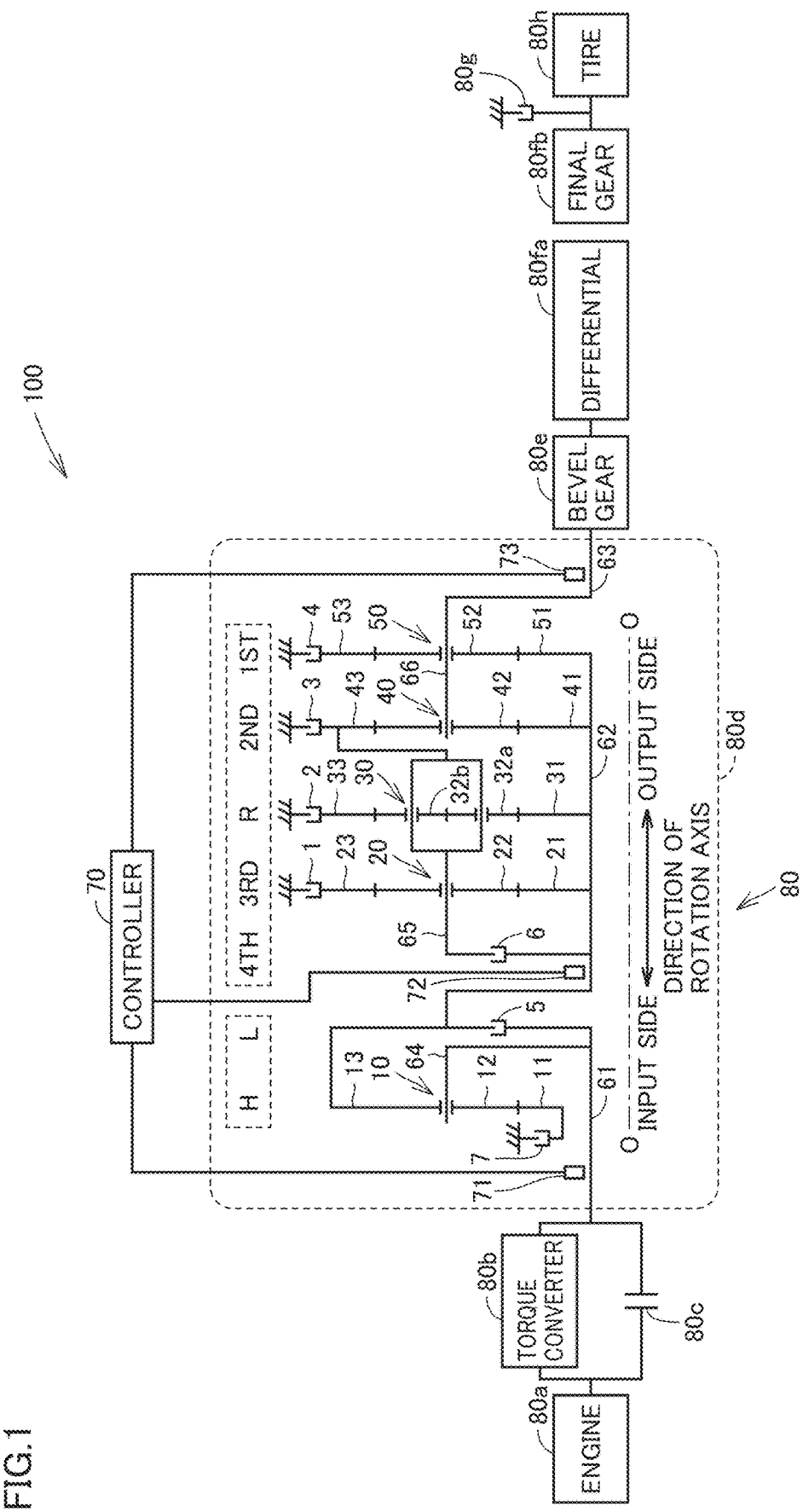
FIG. 1 is a diagram showing a construction of a transfer system of a work machine according to one embodiment.

An embodiment of the present disclosure will be described below with reference to the drawings. In the specification and the drawings, the same or corresponding components have the same reference characters allotted and redundant description will not be repeated. For the sake of description, features may not be shown or may be simplified in the drawings. At least a part of an embodiment and a modification may arbitrarily be combined.

Though a transfer system of a dump truck is described as a transfer system by way of example in the present disclosure, the present disclosure is applicable to any transfer system of a work machine other than the transfer system of the dump truck. The present disclosure is applicable, for example, also to a transfer system of a wheel loader, a crawler dozer, or a motor grader.

Though an apparatus including a planetary gear mechanism as the transfer system is described by way of example in the present disclosure, the present disclosure is not limited to the transfer system including the planetary gear mechanism and is applicable to any transfer system including a clutch.

<Construction of Transfer System in Work Machine>

A construction of a transfer system included in a dump truck representing an exemplary work machine in the present embodiment will initially be described.

FIG. 1 is a diagram showing a construction of a transfer system of a work machine according to one embodiment. As shown in FIG. 1, a dump truck 100 in the present embodiment includes a transfer system 80. Transfer system 80 includes an engine 80a (drive source), a transfer apparatus, and a tire 80h (traveling unit).

The transfer apparatus receives input from engine 80a and provides the input to tire 80h. The transfer apparatus includes a torque converter 80b, a lock-up clutch 80c, a transmission 80d, a bevel gear 80e, a differential 80fa, a final gear 80fb, and a brake 80g.

Engine 80a generates motive power. Motive power generated by engine 80a is transmitted to transmission 80d through torque converter 80b or lock-up clutch 80c. Transmission 80d changes a rotation speed of motive power and transmits resultant motive power to bevel gear 80e. Motive power transmitted to bevel gear 80e rotationally drives tire 80h through differential 80fa and final gear 80fb.

Differential 80fa distributes motive power to left and right tires 80h. Final gear 80fb reduces a speed of motive power transmitted from transmission 80d and transfers resultant motive power to tires 80h. Brake 80g is arranged between final gear 80fb and tires 80h.

Transmission 80d is, for example, a planetary gear type transmission. Transmission 80d includes a plurality of planetary gear mechanisms 10, 20, 30, 40, and 50, a plurality of clutches 1 to 7, an input shaft 61, an intermediate shaft 62, an output shaft 63, and a plurality of carriers 64 to 66.

A first planetary gear mechanism 10, a second planetary gear mechanism 20, a third planetary gear mechanism 30, a fourth planetary gear mechanism 40, and a fifth planetary gear mechanism 50 are arranged in this order along a direction of a rotation axis. From an input side toward an output side, first planetary gear mechanism 10, second planetary gear mechanism 20, third planetary gear mechanism 30, fourth planetary gear mechanism 40, and fifth planetary gear mechanism 50 are sequentially arranged.

Input shaft 61, intermediate shaft 62, and output shaft 63 coaxially extend in the direction of the rotation axis. Each of input shaft 61, intermediate shaft 62, and output shaft 63 is constructed to rotate around a rotation axis O. Rotation axis O corresponds to a centerline of each of input shaft 61, intermediate shaft 62, and output shaft 63.

Motive power from engine 80a is provided to input shaft 61. Motive power changed in rotation speed by transmission 80d is provided from output shaft 63.

First planetary gear mechanism 10 is a single planetary pinion type planetary gear mechanism. First planetary gear mechanism 10 includes a first sun gear 11, a plurality of first planetary gears 12, a first ring gear 13, and a first carrier 64.

First sun gear 11 is constructed to rotate around rotation axis O. First sun gear 11 is arranged on a radially outer side of input shaft 61. First sun gear 11 is annular and input shaft 61 passes through first sun gear 11. First sun gear 11 and input shaft 61 can rotate relatively to each other.

First sun gear 11 is connected to clutch 7 such that rotation thereof is braked. Clutch 7 is, for example, a brake.

Each of the plurality of first planetary gears 12 is constructed to be meshed with first sun gear 11. Each of the plurality of first planetary gears 12 is arranged on the radially outer side of first sun gear 11. The plurality of first planetary gears 12 are arranged at intervals in a circumferential direction.

Each of the plurality of first planetary gears 12 is constructed to revolve around first sun gear 11. Each of the plurality of first planetary gears 12 is constructed to revolve around rotation axis O. Each of the plurality of first planetary gears 12 is constructed to rotate.

First carrier 64 supports each of the plurality of first planetary gears 12. Each of the plurality of first planetary gears 12 is rotatable while it is supported by first carrier 64. First carrier 64 is constructed to rotate around rotation axis O.

First carrier 64 is fixed to input shaft 61 and constructed to rotate integrally with input shaft 61. First carrier 64 and input shaft 61 may be formed from a single member.

First ring gear 13 is meshed with each of the plurality of first planetary gears 12. First ring gear 13 is constructed to rotate around rotation axis O. First ring gear 13 is fixed to intermediate shaft 62 and constructed to rotate integrally with intermediate shaft 62. First ring gear 13 and intermediate shaft 62 may be formed from a single member.

Clutch 5 (second clutch) is arranged between input shaft 61 and intermediate shaft 62 (first ring gear 13). Clutch 5 can be switched between an on (ON) state and an off (OFF) state. When clutch 5 is in the on state, clutch 5 is in a transfer state in which motive power generated by engine 80a is transferred from input shaft 61 to intermediate shaft 62. When clutch 5 is in the off state, clutch 5 is in a cut-off state in which transfer of motive power from engine 80a to intermediate shaft 62 through input shaft 61 is cut off.

Second planetary gear mechanism 20 is a single planetary pinion type planetary gear mechanism. Second planetary gear mechanism 20 includes a second sun gear 21, a plurality of second planetary gears 22, a second ring gear 23, and a second carrier 65.

Second sun gear 12 is constructed to rotate around rotation axis O. Second sun gear 21 is arranged on the radially outer side of intermediate shaft 62. Second sun gear 21 is fixed to intermediate shaft 62 and constructed to rotate integrally with intermediate shaft 62. Second sun gear 21 and intermediate shaft 62 may be formed from a single member.

Each of the plurality of second planetary gears 22 is constructed to be meshed with second sun gear 21. Each of the plurality of second planetary gears 22 is arranged on the radially outer side of second sun gear 12. The plurality of second planetary gears 22 are arranged at intervals in the circumferential direction.

Each of the plurality of second planetary gears 22 is constructed to revolve around second sun gear 21. Each of the plurality of second planetary gears 22 is constructed to revolve around rotation axis O. Each of the plurality of second planetary gears 12 is constructed to rotate.

Second carrier 65 supports each of the plurality of second planetary gears 22. Each of the plurality of second planetary gears 22 is rotatable while it is supported by second carrier 65. Second carrier 65 is constructed to rotate around rotation axis O.

Clutch 6 is arranged between second carrier 65 and intermediate shaft 62. Clutch 6 is switched between a transfer state in which motive power is transferred between intermediate shaft 62 and second carrier 65 and a cut-off state in which transfer of motive power between intermediate shaft 62 and second carrier 65 is cut off.

Second ring gear 23 is meshed with each of the plurality of second planetary gears 22. Second ring gear 23 is constructed to rotate around rotation axis O. Second ring gear 23 is connected to clutch 1 (first clutch) such that rotation thereof is braked. Clutch 1 is, for example, a brake.

Third planetary gear mechanism 30 is a double planetary pinion type planetary gear mechanism. Third planetary gear mechanism 30 includes a third sun gear 31, a plurality of sets of double planetary gears 32a and 32b, a third ring gear 33, and second carrier 65.

Third sun gear 31 is constructed to rotate around rotation axis O. Third sun gear 31 is arranged on the radially outer side of intermediate shaft 62. Third sun gear 31 is fixed to intermediate shaft 62 and constructed to rotate integrally with intermediate shaft 62. Third sun gear 31 and intermediate shaft 62 may be formed from a single member.

Each of the plurality of sets of double planetary gears 32a and 32b includes a planetary gear 32a and a planetary gear 32b. Planetary gear 32a is constructed to be meshed with third sun gear 31. Planetary gear 32b is constructed to be meshed with each of planetary gear 32a and third ring gear 33.

Each of the plurality of sets of double planetary gears 32a and 32b is arranged on the radially outer side of third sun gear 31. The plurality of sets of double planetary gears 32a and 32b are arranged at intervals in the circumferential direction.

Each planetary gear in each set of planetary gear 32a and planetary gear 32b is constructed to revolve around third sun gear 31. Each planetary gear in each set of planetary gear 32a and planetary gear 32b is constructed to rotate around rotation axis O. Each planetary gear in each set of planetary gear 32a and planetary gear 32b is constructed to rotate.

Second carrier 65 supports each planetary gear in each set of planetary gear 32a and planetary gear 32b. Each planetary gear in each set of planetary gear 32a and planetary gear 32b is rotatable while it is supported by second carrier 65.

Third ring gear 33 is meshed with planetary gear 32b in each set. Third ring gear 33 is constructed to rotate around rotation axis O. Third ring gear 33 is connected to clutch 2 such that rotation thereof is braked. Clutch 2 is, for example, a brake.

Fourth planetary gear mechanism 40 is a single planetary pinion type planetary gear mechanism. Fourth planetary gear mechanism 40 includes a fourth sun gear 41, a plurality of fourth planetary gears 42, a fourth ring gear 43, and a third carrier 66.

Fourth sun gear 41 is constructed to rotate around rotation axis O. Fourth sun gear 41 is arranged on the radially outer side of intermediate shaft 62. Fourth sun gear 41 is fixed to intermediate shaft 62 and constructed to rotate integrally with intermediate shaft 62. Fourth sun gear 41 and intermediate shaft 62 may be formed from a single member.

Each of the plurality of fourth planetary gears 42 is constructed to be meshed with fourth sun gear 41. Each of the plurality of fourth planetary gears 42 is arranged on the radially outer side of fourth sun gear 41. The plurality of fourth planetary gears 42 are arranged at intervals in the circumferential direction.

Each of the plurality of fourth planetary gears 42 is constructed to revolve around fourth sun gear 41. Each of the plurality of fourth planetary gears 42 is constructed to revolve around rotation axis O. Each of the plurality of fourth planetary gears 42 is constructed to rotate.

Third carrier 66 supports each of the plurality of fourth planetary gears 42. Each of the plurality of fourth planetary gears 42 is rotatable while it is supported by third carrier 66. Third carrier 66 is constructed to rotate around rotation axis O.

Fourth ring gear 43 is meshed with each of the plurality of fourth planetary gears 42. Fourth ring gear 43 is constructed to rotate around rotation axis O. Fourth ring gear 43 is connected to clutch 3 such that rotation thereof is braked. Clutch 3 is, for example, a brake.

Fourth ring gear 43 is fixed to second carrier 65 and constructed to rotate integrally with second carrier 65. Second carrier 65 and fourth ring gear 43 may be formed from a single member.

Fifth planetary gear mechanism 50 is a single planetary pinion type planetary gear mechanism. Fifth planetary gear mechanism 50 includes a fifth sun gear 51, a plurality of fifth planetary gears 52, a fifth ring gear 53, and a third carrier 66.

Fifth sun gear 51 is constructed to rotate around rotation axis O. Fifth sun gear 51 is arranged on the radially outer side of intermediate shaft 62. Fifth sun gear 51 is fixed to intermediate shaft 62 and constructed to rotate integrally with intermediate shaft 62. Fifth sun gear 51 and intermediate shaft 62 may be formed from a single member.

Each of the plurality of fifth planetary gears 52 is constructed to be meshed with fifth sun gear 51. Each of the plurality of fifth planetary gears 52 is arranged on the radially outer side of fifth sun gear 51. The plurality of fifth planetary gears 52 are arranged at intervals in the circumferential direction.

Each of the plurality of fifth planetary gears 52 is constructed to revolve around fifth sun gear 51. Each of the plurality of fifth planetary gears 52 is constructed to revolve around rotation axis O. Each of the plurality of fifth planetary gears 52 is constructed to rotate.

Third carrier 66 supports each of the plurality of fifth planetary gears 52. Each of the plurality of fifth planetary gears 52 is rotatable while it is supported by third carrier 66.

Fifth ring gear 53 is meshed with each of the plurality of fifth planetary gears 52. Fifth ring gear 53 is constructed to rotate around rotation axis O. Fifth ring gear 53 is connected to clutch 4 such that rotation thereof is braked. Clutch 3 is, for example, a brake.

Third carrier 66 is fixed to output shaft 63 and constructed to rotate integrally with output shaft 63. Third carrier 66 and output shaft 63 may be formed from a single member.

Figure 2:
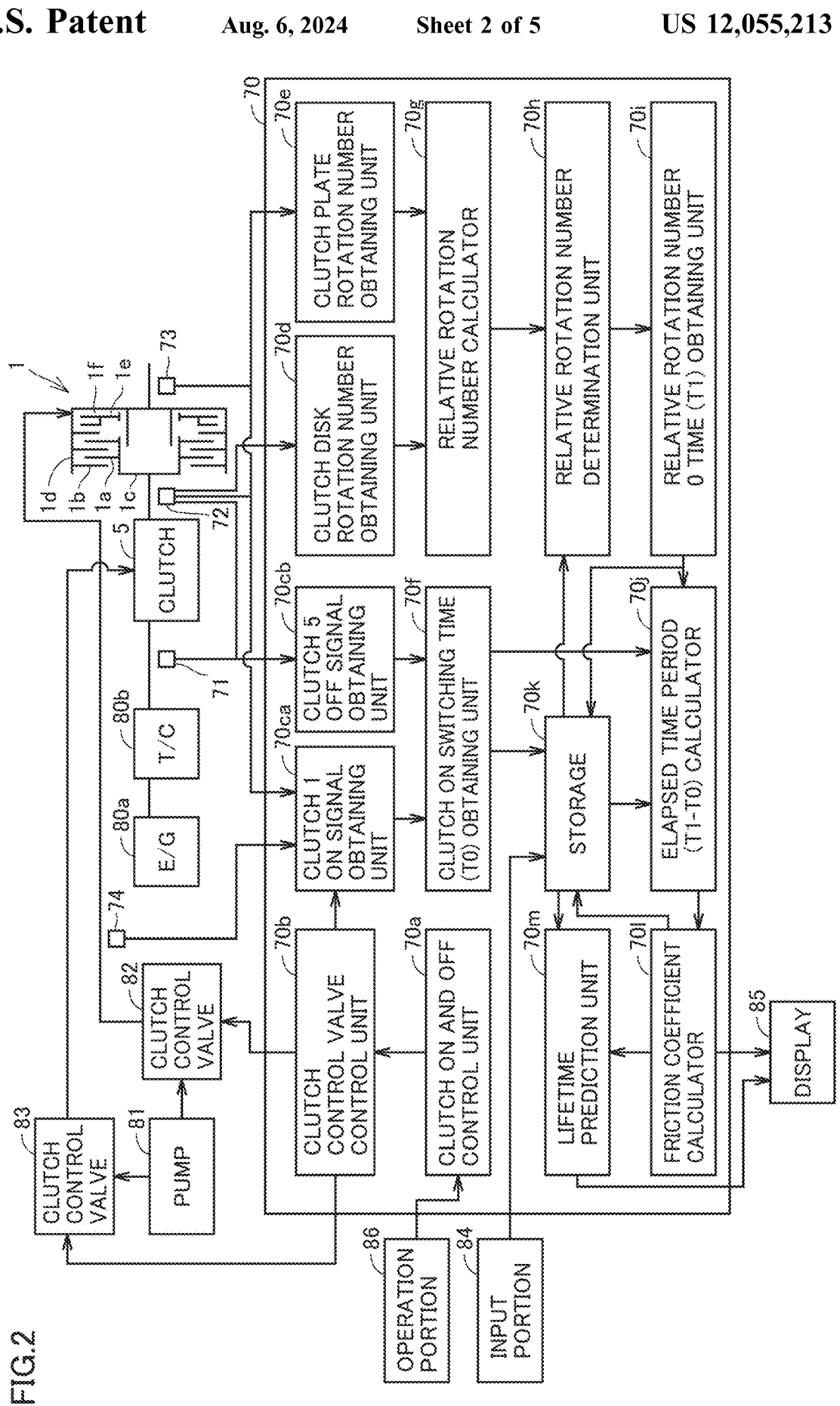
FIG. 2 is a diagram showing a functional block of a controller that calculates a coefficient of friction and predicts lifetime in the transfer system shown in FIG. 1.

Each of the plurality of clutches 1 to 7 is, for example, a hydraulic clutch mechanism, and can be formed from a plurality of disks. Each of the plurality of clutches 1 to 7 includes, for example, a plurality of clutch disks 1a (first members) and a plurality of clutch plates 1b (second members) as shown in FIG. 2.

Each of the plurality of clutch disks 1a rotates by receiving motive power from engine 80a. Each of the plurality of clutch plates 1b is switched between an engaged state in which it is engaged with a corresponding one of the plurality of clutch disks 1a and a disengaged state in which it is not engaged with the corresponding one of the plurality of clutch disks 1a.

When each of the plurality of clutches 1 to 7 is in the on state, the plurality of clutch disks 1a and the plurality of clutch plates 1b are brought in press-contact and engaged with each other to be in the engaged state. Motive power is thus transferred between clutch disk 1a and clutch plate 1b, and the number of relative rotations of clutch disk 1a and clutch plate 1b attains to 0. Since each of clutches 1 to 4 and 7 is the brake, the number of rotations of both of clutch disk 1a and clutch plate 1b attains to 0 when the number of relative rotations of clutch disk 1a and clutch plate 1b attains to 0.

When each of the plurality of clutches 1 to 7 is in the off state, the engaged state between the plurality of clutch disks 1a and the plurality of clutch plates 1b is canceled and the disengaged state is set. The plurality of clutch disks 1a and the plurality of clutch plates 1b are thus disengaged and separate from each other. Therefore, transfer of motive power between the plurality of clutch disks 1a and the plurality of clutch plates 1b is cut off.

Transfer system 80 in the present embodiment further includes a controller 70 and sensors 71 to 73. Sensor 71 is, for example, a rotation sensor that senses the number of rotations of input shaft 61. Sensor 72 is, for example, a rotation sensor that senses the number of rotations of intermediate shaft 62. Sensor 73 is, for example, a rotation sensor that senses the number of rotations of output shaft 63. The number of rotations of clutch disk 1a (FIG. 2) in clutch 1 can be measured with sensor 71 or sensor 72 (first sensor). The number of rotations of clutch plate 1b (FIG. 2) in clutch 1 can be measured with sensor 73 (second sensor).

The number of rotations measured by each of sensors 71 to 73 is provided as a sensing signal to controller 70. Controller 70 calculates a coefficient of friction of clutch 1 based on the number of rotations measured by each of sensors 71 to 73.

Controller 70 senses the on and off states of clutch 5 based on the number of rotations of input shaft 61 sensed by sensor 71 and the number of rotations of intermediate shaft 62 sensed by sensor 72.

Controller 70 senses the on and off states of clutch 1 based on the number of rotations of intermediate shaft 62 sensed by sensor 72 and the number of rotations of output shaft 63 sensed by sensor 73.

Controller 70 senses the number of relative rotations of the clutch disk and the clutch plate of clutch 1 based on the number of rotations of intermediate shaft 62 sensed by sensor 72 and the number of rotations of output shaft 63 sensed by sensor 73. Controller 70 may sense the number of relative rotations of the clutch disk and the clutch plate of clutch 1 based on the number of rotations of input shaft 61 sensed by sensor 71 and the number of rotations of output shaft 63 sensed by sensor 73.

Controller 70 calculates the coefficient of friction of clutch 1 based on a time period elapsed from a first time point when the number of relative rotations of clutch disk 1a and clutch plate 1b of clutch 1 attains to a first number of rotations to a second time point when the second number of rotations smaller than the first number of rotations is attained, in the state in which transfer of motive power from engine 80a to clutch disk 1a of clutch 1 is cut off and in the engaged state in which clutch disk 1a and clutch plate 1b of clutch 1 are engaged with each other. This coefficient of friction of clutch 1 is the coefficient of friction of entire clutch 1 including all coefficients of friction of the plurality of clutch disks and the plurality of clutch plates of clutch 1.

The first time point refers, for example, to a time point when transfer of motive power from engine 80a to clutch disk 1a of clutch 1 is cut off by clutch 5 and clutch 1 is set to the on state. The second time point refers, for example, to a time point when the number of relative rotations of clutch disk 1a and clutch plate 1b of clutch 1 in the engaged state attains to 0.

Controller 70 may be mounted on work machine 100 or may be arranged at a distance on the outside of work machine 100. When controller 70 is arranged at a distance on the outside of work machine 100, controller 70 may wirelessly be connected to sensors 71 to 74, clutch control valves 82 and 83, an operation portion 86, a display 85, and an input portion 84.

<Functional Block of Controller 70>

A functional block of controller 70 in the present embodiment will now be described with reference to FIG. 2.

FIG. 2 is a diagram showing a functional block of the controller that calculates a coefficient of friction and predicts lifetime in the transfer system shown in FIG. 1. As shown in FIG. 2, controller 70 includes a clutch on and off control unit 70a, a clutch control valve control unit 70b, a clutch 1 on signal obtaining unit 70ca, a clutch 5 off signal obtaining unit 70cb, a clutch disk rotation number obtaining unit 70d, a clutch plate rotation number obtaining unit 70e, and a clutch on switching time obtaining unit 70f.

Controller 70 further includes a relative rotation number calculator 70g, a relative rotation number determination unit 70h, a relative rotation number 0 time obtaining unit 70i, an elapsed time period calculator 70j, a storage 70k, a friction coefficient calculator 70l, and a lifetime prediction unit 70m.

Clutch on and off control unit 70a generates a clutch on and off control signal upon receiving an operation signal from operation portion 86. Clutch control valve control unit 70b controls clutch control valves 82 and 83 upon receiving the clutch on and off control signal from clutch on and off control unit 70a.

Clutch control valve 82 controls whether or not to supply hydraulic oil discharged from a pump 81 to a hydraulic chamber 1f of clutch 1 upon receiving the control signal from clutch control valve control unit 70b. When hydraulic oil discharged from pump 81 is not supplied to hydraulic chamber 1f of clutch 1, a hydraulic pressure of hydraulic oil is not applied to a piston 1e of clutch 1. In this case, the plurality of clutch disks 1a and the plurality of clutch plates 1b of clutch 1 are distant from each other, and clutch 1 is in the off state.

When hydraulic oil discharged from pump 81 is supplied to hydraulic chamber 1f of clutch 1, the hydraulic pressure of hydraulic oil is applied to piston 1e of clutch 1. In this case, the plurality of clutch disks 1a and the plurality of clutch plates 1b of clutch 1 are brought in press-contact with each other and clutch 1 is set to the on state.

Clutch disk 1a of clutch 1 is fixed to an outer circumference of a clutch hub 1c, and clutch plate 1b is fixed to an inner circumference of a clutch drum 1d. Clutch hub 1c is fixed to an outer circumference of second ring gear 23 (FIG. 1).

Clutch control valve 83 controls whether or not to supply hydraulic oil discharged from pump 81 to a hydraulic chamber (not shown) of clutch 5 upon receiving a control signal from clutch control valve control unit 70b. When hydraulic oil discharged from pump 81 is not supplied to the hydraulic chamber of clutch 5, as in clutch 1, the plurality of clutch disks and the plurality of clutch plates of clutch 5 are distant from each other and clutch 5 is in the off state.

When hydraulic oil discharged from pump 81 is supplied to the hydraulic chamber of clutch 5, as in clutch 1, the plurality of clutch disks and the plurality of clutch plates of clutch 5 are brought in press-contact with each other and clutch 5 is set to the on state.

Clutch 1 on signal obtaining unit 70ca obtains a signal indicating that clutch 1 has been set to the on state. Clutch 1 on signal obtaining unit 70ca determines whether or not clutch 1 has been set to the on state, for example, based on the number of rotations of intermediate shaft 62 measured by sensor 72 and the number of rotations of output shaft 63 measured by sensor 73.

Clutch 1 on signal obtaining unit 70ca may determine whether or not clutch 1 has been set to the on state based on a control signal (electrical signal) for clutch 1 generated by clutch control valve control unit 70b. Alternatively, clutch 1 on signal obtaining unit 70ca may determine whether or not clutch 1 has been set to the on state based on a pressure of hydraulic oil (a pressure of hydraulic oil discharged from clutch control valve 82) measured by a pressure sensor 74. Alternatively, clutch 1 on signal obtaining unit 70ca may determine whether or not clutch 1 has been set to the on state based on a stroke of piston 1e in clutch 1 measured by a stroke sensor (not shown).

Clutch 5 off signal obtaining unit 70cb obtains a signal indicating that clutch 5 has been set to the off state. Clutch 5 off signal obtaining unit 70cb determines whether or not clutch 5 has been set to the off state, for example, based on the number of rotations of input shaft 61 measured by sensor 71 and the number of rotations of intermediate shaft 62 measured by sensor 72.

Clutch disk rotation number obtaining unit 70d obtains the number of rotations of clutch disk 1a of clutch 1 based on the number of rotations of intermediate shaft 62 measured by sensor 72.

Clutch plate rotation number obtaining unit 70e obtains the number of rotations of clutch plate 1b of clutch 1 based on the number of rotations of output shaft 63 measured by sensor 73.

Clutch on switching time obtaining unit 70f obtains a first time point (T0) when clutch 1 is switched to the on state based on a clutch 5 off signal from clutch 5 off signal obtaining unit 70cb and a clutch 1 on signal from clutch 1 on signal obtaining unit 70ca. Specifically, clutch on switching time obtaining unit 70f obtains the first time point (T0) when clutch 1 is switched to the on state after clutch 5 is switched to the off state. The first time point (T0) obtained by clutch on switching time obtaining unit 70f may be stored in storage 70k.

Relative rotation number calculator 70g calculates the number of relative rotations of clutch disk 1a and clutch plate 1b based on the number of rotations of clutch disk 1a from clutch disk rotation number obtaining unit 70d and the number of rotations of clutch plate 1b from clutch plate rotation number obtaining unit 70e.

Relative rotation number determination unit 70h determines whether or not the number of relative rotations of clutch disk 1a and clutch plate 1b calculated by relative rotation number calculator 70g has attained to a prescribed value. The prescribed value represents a second number of rotations smaller than the number of relative rotations (the first number of rotations) of clutch disk 1a and clutch plate 1b at the first time point (T0). The prescribed value (the second number of rotations) is set, for example, to 0. The prescribed value may be stored in storage 70k. In this case, relative rotation number determination unit 70h determines whether or not the number of relative rotations has attained to the prescribed value by referring to the prescribed value stored in storage 70k.

Relative rotation number 0 time obtaining unit 70i obtains a second time point (T1) when the number of relative rotations of clutch disk 1a and clutch plate 1b attains to the prescribed value. The second time point (T1) obtained by relative rotation number 0 time obtaining unit 70i may be stored in storage 70k.

Elapsed time period calculator 70j calculates an elapsed time period Δt based on the first time point (T0) obtained by clutch on switching time obtaining unit 70f and the second time point (T1) obtained by relative rotation number 0 time obtaining unit 70i. Elapsed time period calculator 70j may calculate elapsed time period Δt based on the first time point (T0) and the second time point (T1) stored in storage 70k. Elapsed time period Δt is obtained from an expression Δt=T1−T0.

Friction coefficient calculator 70l calculates a coefficient of friction μ of clutch 1 based on elapsed time period Δt calculated by elapsed time period calculator 70j. Coefficient of friction μ of clutch 1 is calculated from an expression μ=k/Δt, where k represents a proportionality constant.

Coefficient of friction μ calculated by friction coefficient calculator 70l may be stored in storage 70k. When friction coefficient calculator 70l calculates a plurality of coefficients of friction μ different in time point of measurement, the plurality of coefficients of friction μ different in time point of measurement are stored in storage 70k.

Lifetime prediction unit 70m predicts lifetime of clutch 1 based on coefficient of friction μ of clutch 1 calculated by friction coefficient calculator 70l. At this time, lifetime of clutch 1 may be predicted based on the plurality of coefficients of friction μ different in time point of measurement stored in storage 70k.

Coefficient of friction μ of clutch 1 calculated by friction coefficient calculator 70l and lifetime of clutch 1 predicted by lifetime prediction unit 70m may be shown on display 85. Display 85 may be connected to controller 70 by wired or wireless connection.

Another piece of information from input portion 84 outside controller 70 may be stored in storage 70k. For example, a prescribed value (the second number of rotations) for determining the number of relative rotations of clutch disk 1a and clutch plate 1b from input portion 84 may be stored in storage 70k. A mathematical expression for calculating coefficient of friction μ from input portion 84 may be stored in storage 70k.

<Method of Predicting Lifetime of Transfer System>

A method of predicting lifetime of the transfer system in the work machine according to the present embodiment will now be described with reference to FIGS. 2 to 5.

Figure 3:
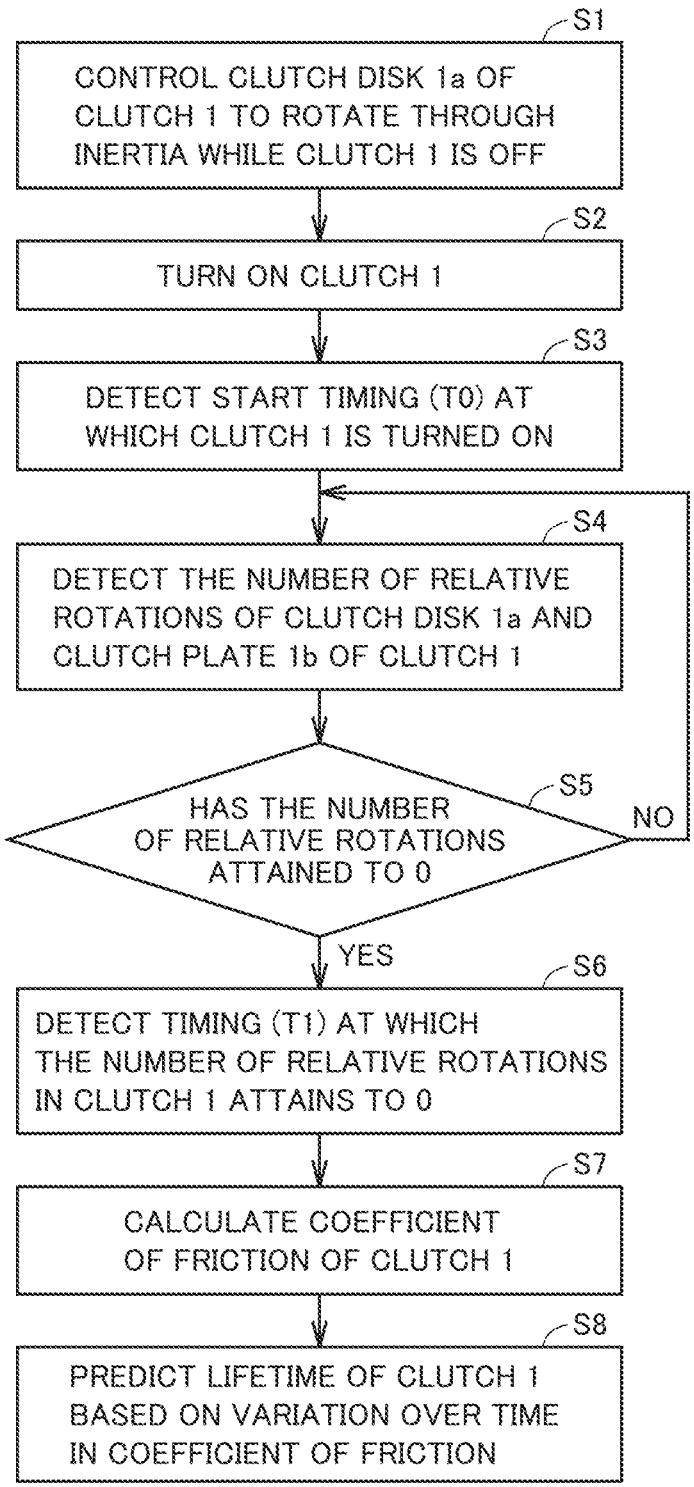
FIG. 3 is a flowchart showing a method of predicting lifetime of the transfer system in the work machine according to one embodiment.
Figure 4:
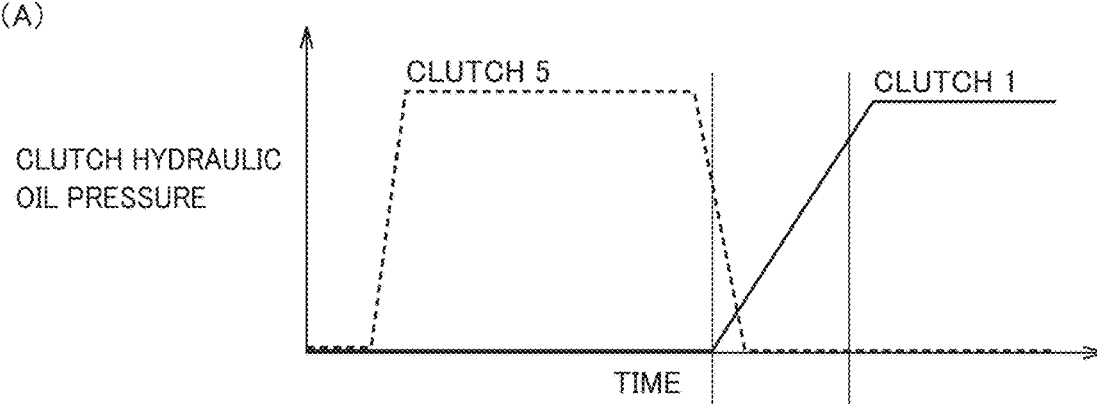
FIG. 4 is a diagram showing change over time in (A) a clutch hydraulic oil pressure and (B) a clutch relative rotation number in clutches 1 and 5 shown in FIG. 1.
Figure 4:
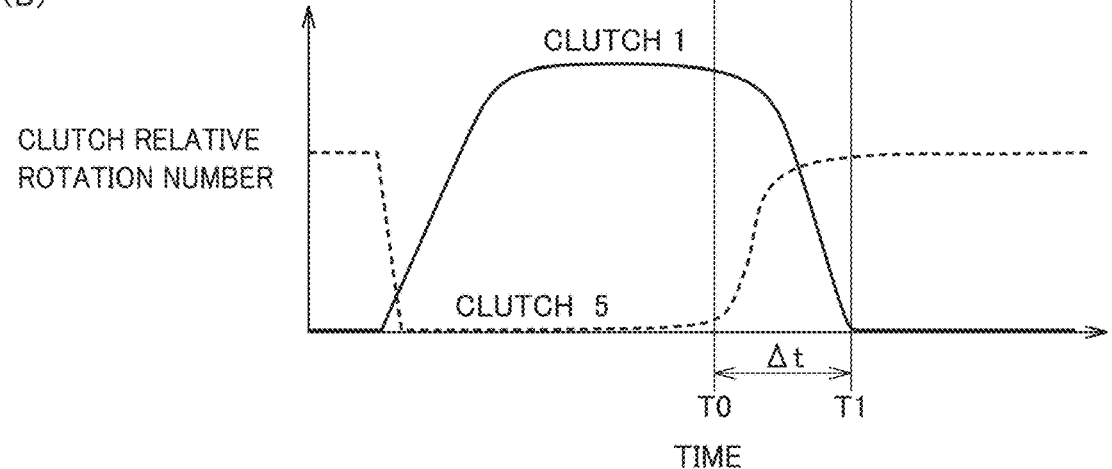
Figure 5:
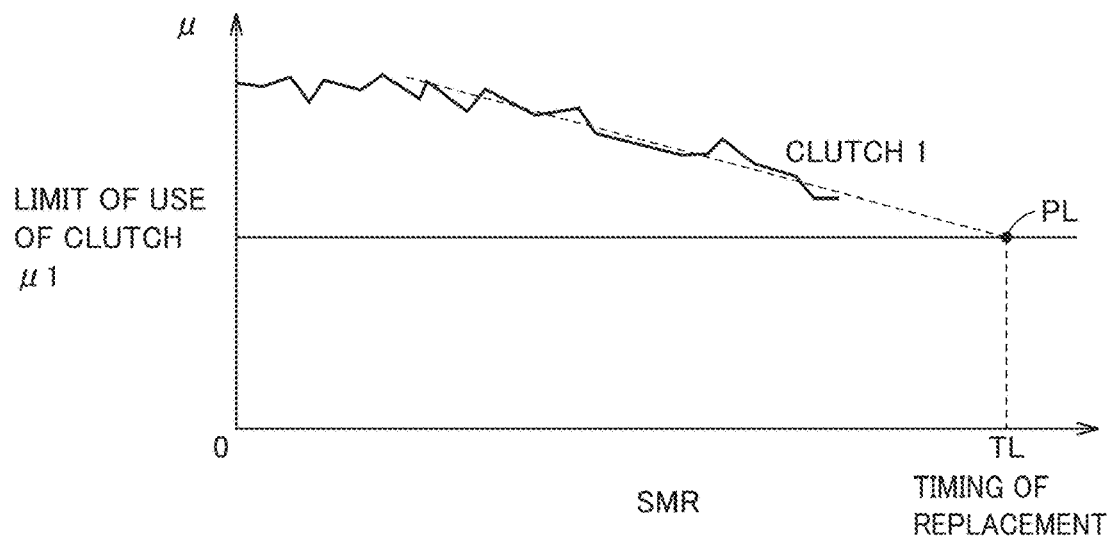
FIG. 5 is a diagram showing relation between service meter reading SMR of an engine and a coefficient of friction μ.

FIG. 3 is a flowchart showing a method of predicting lifetime of the transfer system in the work machine according to one embodiment. FIG. 4 is a diagram showing change over time in (A) a clutch hydraulic oil pressure and (B) a clutch relative rotation number in clutches 1 and 5 shown in FIG. 1. FIG. 5 is a diagram showing relation between service meter reading SMR of an engine and coefficient of friction μ.

As shown in FIGS. 1 and 2, when dump truck 100 stops traveling (brake 80g is set to the on state), controller 70 gives an instruction to clutch control valves 82 and 83 to set clutch 5 to the on state and set clutch 1 to the off state. In this state, as shown in FIG. 4 (A), hydraulic oil discharged from pump 81 (FIG. 2) is not supplied to clutch 1. On the other hand, hydraulic oil discharged from pump 81 is supplied to clutch 5. Input shaft 61 and intermediate shaft 62 are thus coupled to each other with clutch 5 shown in FIG. 1 being interposed. Clutch plate 1b of clutch 1 shown in FIG. 2 is distant from clutch disk 1a.

As shown in FIG. 2, engine 80a is controlled to be driven to achieve constant rotation in this state. Motive power generated in engine 80a is transferred to clutch disk 1a of clutch 1 through input shaft 61 and intermediate shaft 62. Clutch disk 1a thus rotates. Clutch plate 1b of clutch 1 does not rotate because it is distant from clutch disk 1a.

Thus, as shown in FIG. 4 (B), the number of relative rotations of the clutch disk and the clutch plate of clutch 5 is set to 0. The number of relative rotations of clutch disk 1a and clutch plate 1b of clutch 1 increases.

In this state, controller 70 shown in FIG. 2 gives an instruction to clutch control valve 83 to set clutch 5 to the off state. In this state, as shown in FIG. 4 (A), hydraulic oil discharged from pump 81 is no longer supplied to clutch 5. The clutch plate of clutch 5 shown in FIG. 1 is thus moved away from the clutch disk and transfer of motive power from input shaft 61 to intermediate shaft 62 is cut off by clutch 5. Therefore, intermediate shaft 62 and clutch disk 1*a* are rotated by inertial force (step S1: FIG. 3).

Thereafter, controller 70 shown in FIG. 2 gives an instruction to clutch control valve 82 to set clutch 1 to the on state (step S2: FIG. 3). In this state, as shown in FIG. 4 (A), hydraulic oil discharged from pump 81 is supplied to clutch 1. Clutch disk 1*a* and clutch plate 1*b* of clutch 1 are thus brought in press-contact with each other. Therefore, as shown in FIG. 4 (B), the number of relative rotations of clutch disk 1*a* and clutch plate 1*b* of clutch 1 decreases.

Start timing at which clutch 1 is set to the on state is detected as the first time point (T0) (step S3: FIG. 3). In detection of the first time point (T0), as shown in FIG. 2, initially, clutch 5 off signal obtaining unit 70*cb* obtains a signal indicating that clutch 5 is set to the off state. Clutch 5 off signal obtaining unit 70*cb* determines whether or not clutch 5 has been set to the off state, for example, based on the number of rotations of input shaft 61 measured by sensor 71 and the number of rotations of intermediate shaft 62 measured by sensor 72.

Then, clutch 1 on signal obtaining unit 70*ca* obtains a signal indicating that clutch 1 has been set to the on state. Clutch 1 on signal obtaining unit 70*ca* determines whether or not clutch 1 has been set to the on state, for example, based on the number of rotations of intermediate shaft 62 measured by sensor 72 and the number of rotations of output shaft 63 measured by sensor 73.

Alternatively, clutch 1 on signal obtaining unit 70*ca* may determine whether or not clutch 1 has been set to the on state based on a clutch 1 control signal (electrical signal) generated by clutch control valve control unit 70*b*. Alternatively, clutch 1 on signal obtaining unit 70*ca* may determine whether or not clutch 1 has been set to the on state based on a pressure of hydraulic oil (a pressure of hydraulic oil discharged from clutch control valve 82) measured by pressure sensor 74. Alternatively, clutch 1 on signal obtaining unit 70*ca* may determine whether or not clutch 1 has been set to the on state based on a stroke of piston 1*e* in clutch 1 measured by a stroke sensor (not shown).

Clutch on switching time obtaining unit 70*f* obtains the first time point (T0) when clutch 1 is switched to the on state, based on a clutch 5 off signal from clutch 5 off signal obtaining unit 70*cb* and a clutch 1 on signal from clutch 1 on signal obtaining unit 70*ca*. Specifically, clutch on switching time obtaining unit 70*f* obtains the first time point (T0) when clutch 1 is switched to the on state after clutch 5 is switched to the off state.

Then, the number of relative rotations of clutch disk 1*a* and clutch plate 1*b* of clutch 1 is detected (step S4: FIG. 3). In detection of the number of relative rotations, as shown in FIG. 2, initially, clutch disk rotation number obtaining unit 70*d* obtains the number of rotations of clutch disk 1*a*. Clutch plate rotation number obtaining unit 70*e* obtains the number of rotations of clutch plate 1*b*.

Relative rotation number calculator 70*g* calculates the number of relative rotations of clutch disk 1*a* and clutch plate 1*b* based on the number of rotations of clutch disk 1*a* from clutch disk rotation number obtaining unit 70*d* and the number of rotations of clutch plate 1*b* from clutch plate rotation number obtaining unit 70*e*.

Then, whether or not the number of relative rotations of clutch disk 1*a* and clutch plate 1*b* has attained to a prescribed value (for example, 0) is determined (step S5: FIG. 3). In determination of the number of relative rotations, as shown in FIG. 2, relative rotation number determination unit 70*h* determines whether or not the number of relative rotations calculated by relative rotation number calculator 70*g* has attained to the prescribed value (for example, 0).

When the number of relative rotations has not attained to the prescribed value as a result of determination above, the number of relative rotations of clutch disk 1*a* and clutch plate 1*b* is again detected (step S4: FIG. 3).

When the number of relative rotations attains to the prescribed value as a result of determination above, the second time point (T1) when the number of relative rotations of clutch disk 1*a* and clutch plate 1*b* has attained to the prescribed value is detected (step S6: FIG. 3). Relative rotation number 0 time obtaining unit 70*i* detects the second time point (T1) as shown in FIG. 2.

Then, the coefficient of friction of clutch 1 is calculated (step S7: FIG. 3). In calculating the coefficient of friction, as shown in FIG. 2, initially, elapsed time period calculator 70*j* calculates elapsed time period $\Delta t$ based on the first time point (T0) obtained by clutch on switching time obtaining unit 70*f* and the second time point (T1) obtained by relative rotation number 0 time obtaining unit 70*i*. Elapsed time period $\Delta t$ is obtained from the expression $\Delta t = T1 - T0$.

Friction coefficient calculator 70*l* calculates coefficient of friction $\mu$ of clutch 1 based on elapsed time period $\Delta t$ calculated by elapsed time period calculator 70*j*. Coefficient of friction $\mu$ of clutch 1 is calculated from the expression $\mu = k/\Delta t$.

Then, lifetime of clutch 1 is predicted based on change over time in coefficient of friction (step S8: FIG. 3). In predicting lifetime of clutch 1, as shown in FIG. 2, lifetime prediction unit 70*m* predicts lifetime of clutch 1 based on the coefficient of friction of clutch 1 calculated by friction coefficient calculator 70*l*.

Specifically, as shown in FIG. 5, lifetime prediction unit 70*m* generates relation between coefficient of friction $\mu$ and service meter reading (SMR) based on a plurality of coefficients of friction $\mu$ different in time point of measurement stored in storage 70*k*. Lifetime prediction unit 70*m* derives a straight line (a dashed line in FIG. 5) that is approximated to change in coefficient of friction $\mu$ from relation between coefficient of friction $\mu$ and service meter reading SMR. Lifetime prediction unit 70*m* predicts as lifetime of clutch 1, service meter reading TL of engine 80*a* at a point PL where the derived straight line intersects with a coefficient of friction $\mu$ representing the limit of use of clutch 1.

Coefficient of friction $\mu$ of clutch 1 can be calculated as set forth above and lifetime of clutch 1 can be predicted based on calculated coefficient of friction $\mu$.

<Modification>

A construction of a transfer system included in a crawler dozer 100A as a modification of the work machine will now be described with reference to FIG. 6.

Figure 6:
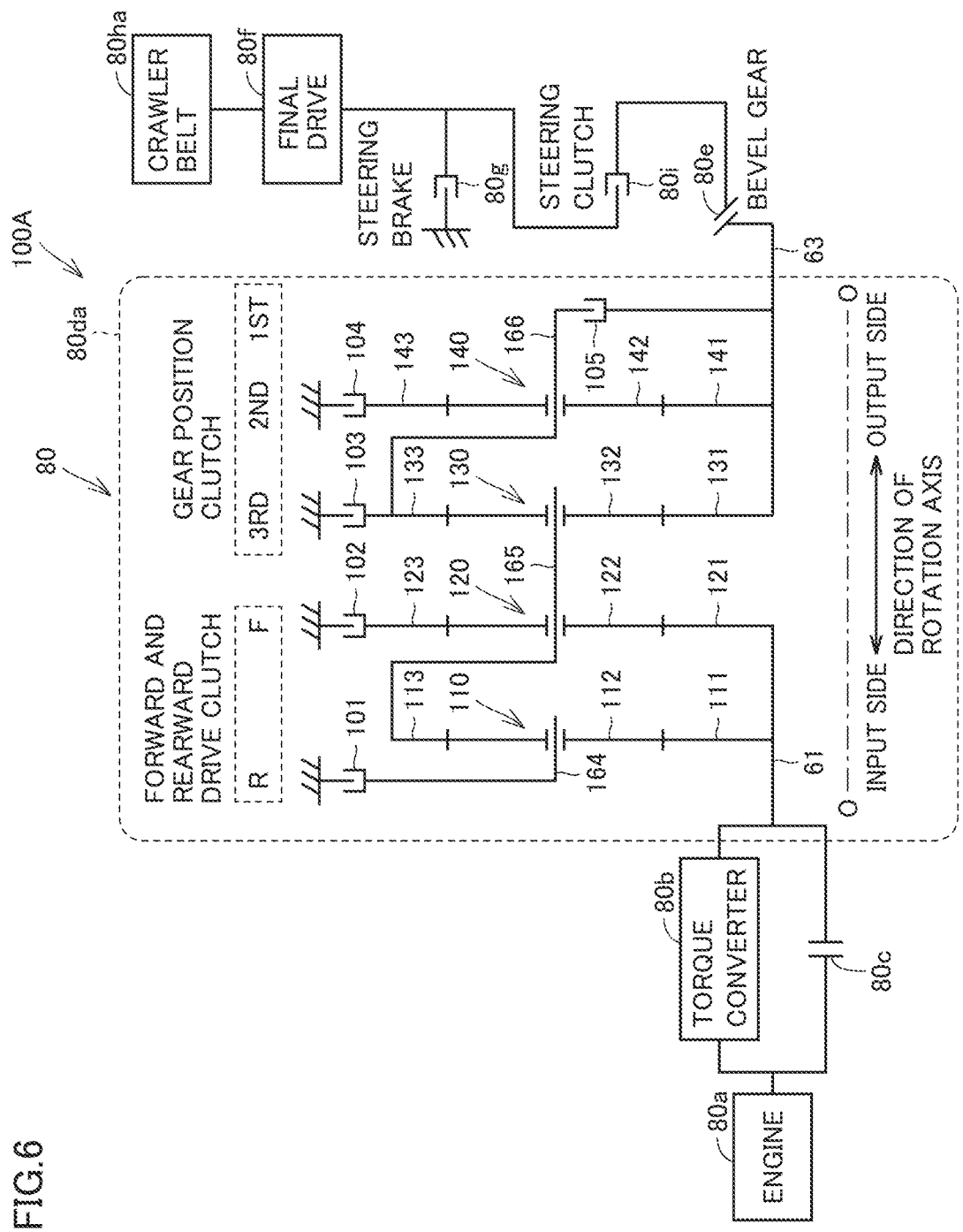
FIG. 6 is a diagram showing a construction of a transfer system of a work machine according to a modification.

FIG. 6 is a diagram showing a construction of a transfer system of a work machine according to the modification. As shown in FIG. 6, crawler dozer 100A in the present modification includes transfer system 80. Transfer system 80 includes engine 80*a* (drive source), a transfer apparatus, and a crawler belt 80*ha* (traveling unit).

The transfer apparatus receives input from engine 80*a* and provides the input to crawler belt 80*ha*. The transfer apparatus includes torque converter 80*b*, lock-up clutch 80*c*, a transmission 80*da*, bevel gear 80*e*, a final drive 80*f*, brake 80*g*, and a steering clutch 80*i*.

The construction in the present modification is different from the construction of transfer system 80 in dump truck 100 shown in FIG. 1 in including transmission 80*da*, steering clutch 80*i*, brake 80*g*, and final drive 80*f*.

Transmission 80*da* is, for example, a planetary gear type transmission. Transmission 80*da* includes a plurality of planetary gear mechanisms 110, 120, 130, and 140, a plurality of clutches 101 to 105, input shaft 61, output shaft 63, and a plurality of carriers 164 to 166.

A first planetary gear mechanism 110, a second planetary gear mechanism 120, a third planetary gear mechanism 130, and a fourth planetary gear mechanism 140 are arranged in this order along the direction of the rotation axis. From the input side toward the output side, first planetary gear mechanism 110, second planetary gear mechanism 120, third planetary gear mechanism 130, and fourth planetary gear mechanism 140 are sequentially arranged.

Input shaft 61 and output shaft 63 coaxially extend in the direction of the rotation axis. Each of input shaft 61 and output shaft 63 is constructed to rotate around rotation axis O. Rotation axis O corresponds to the centerline of each of input shaft 61 and output shaft 63.

Motive power from engine 80*a* is provided to input shaft 61. Motive power changed in rotation speed by transmission 80*da* is provided from output shaft 63.

First planetary gear mechanism 110 is a single planetary pinion type planetary gear mechanism. First planetary gear mechanism 110 includes a sun gear 111, a plurality of planetary gears 112, a ring gear 113, and carrier 164.

Sun gear 111 is constructed to rotate around rotation axis O. Sun gear 111 is arranged on the radially outer side of input shaft 61. Sun gear 111 is fixed to input shaft 61 and constructed to rotate integrally with input shaft 61.

Each of the plurality of planetary gears 112 is constructed to be meshed with sun gear 111. Each of the plurality of planetary gears 112 is arranged on the radially outer side of sun gear 111. The plurality of planetary gears 112 are arranged at intervals in the circumferential direction.

Each of the plurality of planetary gears 112 is constructed to revolve around sun gear 111. Each of the plurality of planetary gears 112 is constructed to revolve around rotation axis O. Each of the plurality of planetary gears 112 is constructed to rotate.

Ring gear 113 is meshed with each of the plurality of planetary gears 112. Ring gear 113 is constructed to rotate around rotation axis O.

Second planetary gear mechanism 120 is a single planetary pinion type planetary gear mechanism. Second planetary gear mechanism 120 includes a sun gear 121, a plurality of planetary gears 122, a ring gear 123, and a carrier 165.

Sun gear 121, the plurality of planetary gears 122, and ring gear 123 of second planetary gear mechanism 120 are similar in construction to sun gear 111, the plurality of planetary gears 112, and ring gear 113 of first planetary gear mechanism 110, respectively.

Third planetary gear mechanism 130 is a single planetary pinion type planetary gear mechanism. Third planetary gear mechanism 130 includes a sun gear 131, a plurality of planetary gears 132, a ring gear 133, and carrier 166.

Sun gear 131, the plurality of planetary gears 132, and ring gear 133 of third planetary gear mechanism 130 are similar in construction to sun gear 111, the plurality of planetary gears 112, and ring gear 113 of first planetary gear mechanism 110, respectively.

Fourth planetary gear mechanism 140 is a single planetary pinion type planetary gear mechanism. Fourth planetary gear mechanism 140 includes a sun gear 141, a plurality of planetary gears 142, a ring gear 143, and carrier 166.

Sun gear 141, the plurality of planetary gears 142, and ring gear 143 of fourth planetary gear mechanism 140 are similar in construction to sun gear 111, the plurality of planetary gears 112, and ring gear 113 of first planetary gear mechanism 110, respectively.

Carrier 164 of first planetary gear mechanism 110 supports each of the plurality of planetary gears 112. Each of the plurality of planetary gears 112 is rotatable while it is supported by carrier 164. Carrier 164 is constructed to rotate around rotation axis O.

Carrier 164 of first planetary gear mechanism 110 is connected to clutch 101 such that rotation thereof is braked. Clutch 101 is, for example, a brake.

Ring gear 113 of first planetary gear mechanism 110 is fixed to carrier 165 of each of second planetary gear mechanism 120 and third planetary gear mechanism 130, and constructed to rotate integrally with carrier 165.

Carrier 165 supports each of the plurality of planetary gears 122 and each of the plurality of planetary gears 132. Each of the plurality of planetary gears 122 and each of the plurality of planetary gears 132 are rotatable while they are supported by carrier 165. Carrier 165 is constructed to rotate around rotation axis O.

Ring gear 123 of second planetary gear mechanism 120 is connected to clutch 102 such that rotation thereof is braked. Clutch 102 is, for example, a brake.

Ring gear 133 of third planetary gear mechanism 130 is connected to clutch 103 such that rotation thereof is braked. Clutch 103 is, for example, a brake.

Ring gear 123 of third planetary gear mechanism 130 is fixed to carrier 166 of fourth planetary gear mechanism 140 and constructed to rotate integrally with carrier 166.

Carrier 166 of fourth planetary gear mechanism 140 supports each of the plurality of planetary gears 142. Each of the plurality of planetary gears 142 is rotatable while it is supported by carrier 166. Carrier 166 is constructed to rotate around rotation axis O.

Ring gear 143 of fourth planetary gear mechanism 140 is connected to clutch 104 such that rotation thereof is braked. Clutch 104 is, for example, a brake.

Clutch 105 is arranged between carrier 166 and output shaft 63.

Steering clutch 80*i* and brake 80*g* are arranged between bevel gear 80*e* and final drive 80*f*. Brake 80*g* is arranged between steering clutch 80*i* and final drive 80*f*.

Since the construction of transfer system 80 in the present modification is otherwise substantially the same as the construction of transfer system 80 shown in FIG. 1, the same elements have the same reference characters allotted and description thereof will not be repeated.

In transfer system 80, by controlling on and off of clutches 101 and 102, the clutch disk of any of clutches 103 to 105 can be rotated by inertial force. By setting the clutch from this state to the on state, the number of relative rotations of the clutch disk and the clutch plate can be set from the first number of rotations to the second number of rotations smaller than the first number of rotations. The coefficient of friction can be calculated based on a time period elapsed from the first time point when the first number of rotations is attained to the second time point when the second number of rotations is attained.

<Functions and Effects>

Functions and Effects of the present embodiment will now be described.

According to the present embodiment, as shown in FIG. 2, initially, while clutch 5 is in the on state and clutch 1 is in the off state, motive power of engine 80a is transferred to clutch disk 1a of clutch 1. From this state, clutch 5 is set to the off state and clutch 1 is set to the on state. Specifically, a state in which transfer of motive power from engine 80a to clutch disk 1a is cut off is set, and a state in which clutch disk 1a and clutch plate 1b are engaged with each other is set. As clutch 5 is set to the off state, clutch disk 1a is rotated by inertial force. As clutch 1 is set to the on state, clutch plate 1b is brought in press-contact with clutch disk 1a that is rotated by inertial force.

In this state, time period Δt elapsed from the first time point when the number of relative rotations of clutch disk 1a and clutch plate 1b attains to the first number of rotations to the second time point when the second number of rotations smaller than the first number of rotations is attained is calculated.

Coefficient of friction μ between clutch disk 1a and clutch plate 1b is calculated based on elapsed time period Δt. Coefficient of friction μ can be calculated, for example, based on the expression μ=k/Δt.

Since the coefficient of friction of clutch 1 is thus calculated, deterioration of friction performance of clutch 1 can quantitatively be detected. Deterioration due to friction of clutch 1 can thus more accurately be detected.

Coefficient of friction μ can be calculated from the number of relative rotations of clutch disk 1a and clutch plate 1b. Therefore, friction performance of clutch 1 can be measured with an existing sensor (for example, a rotation sensor, a pressure sensor, or a stroke sensor). Necessity for a dedicated measurement instrument for measuring friction performance of clutch 1 is thus obviated. It is also unnecessary to take clutch disk 1a or clutch plate 1b of clutch 1 out of work machine 100.

According to the present embodiment, as shown in FIG. 2, work machine 100 includes clutch 5 switched between the transfer state in which motive power is transferred from engine 80a to clutch disk 1a and the cut-off state in which transfer of motive power from engine 80a to clutch disk 1a is cut off. By cutting off transfer of motive power from engine 80a to clutch disk 1a by using clutch 5, a state in which clutch disk 1a is rotated by inertial force is readily obtained.

According to the present embodiment, as shown in FIG. 2, the first time point when the number of relative rotations attains to the first number of rotations is, for example, time point T0 when transfer of motive power from engine 80a to clutch disk 1a is cut off by clutch 5 and clutch 1 is set to the on state. The second time point when the number of relative rotations attains to the second number of rotations is, for example, time point T1 when the number of relative rotations of clutch disk 1a and clutch plate 1b in the engaged state attains to 0. Elapsed time period Δt in this case is obtained by calculating T1−T0. Coefficient of friction μ of clutch 1 can thus more accurately be calculated.

According to the present embodiment, as shown in FIG. 2, work machine 100 includes storage 70k where coefficient of friction μ calculated by controller 70 is stored. As shown in FIG. 5, controller 70 predicts lifetime of clutch 1 based on coefficient of friction μ stored in storage 70k. Lifetime of clutch 1 can thus accurately be predicted.

Though prediction of lifetime by calculation of the coefficient of friction of clutch 1 is described above, according to the present disclosure, lifetime can also be predicted by calculating the coefficient of friction of other clutches 2 to 7 similarly to clutch 1.

The first time point is not limited to time point T0 when transfer of motive power from engine 80a to clutch disk 1a is cut off by clutch 5 and clutch 1 is set to the on state. The first time point may be a time point before or after time point T0 when transfer of motive power from engine 80a to clutch disk 1a is cut off by clutch 5 and clutch 1 is set to the on state.

The second time point is not limited to time point T1 when the number of relative rotations of clutch disk 1a and clutch plate 1b in the engaged state attains to 0.

The second time point may be a time point before time point T1 when the number of relative rotations of clutch disk 1a and clutch plate 1b in the engaged state attains to 0.

It should be understood that the embodiment disclosed herein is illustrative and non-restrictive in every respect. The scope of the present invention is defined by the terms of the claims rather than the description above and is intended to include any modifications within the scope and meaning equivalent to the terms of the claims.

REFERENCE SIGNS LIST 1, 2, 3, 4, 5, 6, 7, 101, 102, 103, 104, 105 clutch; 1a clutch disk; 1b clutch plate; 1c clutch hub; 1d clutch drum; 1e piston; 1f hydraulic chamber; 10, 20, 30, 40, 50, 110, 120, 130, 140 planetary gear mechanism; 11, 21, 31, 41, 51, 111, 121, 131, 141 sun gear; 12, 22, 32a, 32b, 42, 52, 112, 122, 132, 142 planetary gear; 13, 23, 33, 43, 53, 113, 123, 133, 143 ring gear; 61 input shaft; 62 intermediate shaft; 63 output shaft; 64, 65, 66, 164, 165, 166 carrier; 70 controller; 70a off control unit; 70b clutch control valve control unit; 70ca clutch 1 on signal obtaining unit; 70cb clutch 5 off signal obtaining unit; 70d clutch disk rotation number obtaining unit; 70e clutch plate rotation number obtaining unit; 70f clutch on switching time obtaining unit; 70g relative rotation number calculator; 70h relative rotation number determination unit; 70i relative rotation number 0 time obtaining unit; 70j elapsed time period calculator; 70k storage; 70l friction coefficient calculator; 70m lifetime prediction unit; 71, 72, 73 sensor; 74 pressure sensor; 80 transfer system; 80a engine; 80b torque converter; 80c lock-up clutch; 80d, 80da transmission; 80e bevel gear; 80f final drive; 80fa differential; 80fb final gear; 80g brake; 80h tire; 80ha crawler belt; 80i steering clutch; 81 pump; 82, 83 clutch control valve; 84 input portion; 85 display; 86 operation portion; 100, 100A work machine

The invention claimed is:

1. A transfer system of a work machine comprising:
   a drive source;
   a first clutch including a first member that rotates by receiving motive power from the drive source and a second member switched between an engaged state in which the second member is engaged with the first member and a disengaged state in which the second member is not engaged with the first member; and
   a controller that calculates a coefficient of friction between the first member and the second member based on a time period elapsed from a first time point when a number of relative rotations of the first member and the second member attains to a first number of rotations to a second time point when a second number of rotations smaller than the first number of rotations is attained, in a state in which transfer of motive power from the drive source to the first member that is rotating is cut off and in the engaged state.

2. The transfer system of the work machine according to claim 1, further comprising a second clutch switched between a transfer state in which motive power is transferred from the drive source to the first member and a cut-off state in which transfer of motive power from the drive source to the first member is cut off.

3. The transfer system of the work machine according to claim 2, wherein
the first time point is a time point when transfer of motive power from the drive source to the first member is cut off by the second clutch and the first clutch is turned on, and
the second time point is a time point when the number of relative rotations of the first member and the second member in the engaged state attains to 0.

4. The transfer system of the work machine according to claim 1, further comprising a storage where the coefficient of friction calculated by the controller is stored, wherein
the controller predicts lifetime of the first clutch based on the coefficient of friction stored in the storage.

5. The transfer system of the work machine according to claim 1, further comprising:
a first sensor that measures a number of rotations of the first member; and
a second sensor that measures a number of rotations of the second member.

6. A work machine comprising the transfer system according to claim 1.

7. A method of predicting lifetime of a transfer system in a work machine comprising:
indicating cut-off of transfer of motive power from a drive source to a first member of a first clutch while the first member is rotating;
indicating engagement of a second member of the first clutch with the first member that rotates while transfer of motive power from the drive source to the first member is cut off; and
calculating a coefficient of friction between the first member and the second member based on a time period elapsed from a first time point when a number of relative rotations of the first member and the second member attains to a first number of rotations to a second time point when a second number of rotations smaller than the first number of rotations is attained.

8. The method of predicting lifetime of the transfer system in the work machine according to claim 7, wherein
the calculating the coefficient of friction includes calculating a plurality of coefficients of friction different in time point of measurement, and
the method further comprises predicting lifetime of the first clutch based on the plurality of calculated coefficients of friction.

* * * * *